US012668283B2

(12) United States Patent
Kuroda

(10) Patent No.: US 12,668,283 B2
(45) Date of Patent: Jun. 30, 2026

(54) TRAVEL CONTROLLER AND TRAVEL CONTROL METHOD FOR ALERTING DRIVER OF ROAD EDGE

(71) Applicants: TOYOTA JIDOSHA KABUSHIKI KAISHA, Toyota (JP); DENSO CORPORATION, Kariya (JP)

(72) Inventor: Ryusuke Kuroda, Edogawa-ku (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 250 days.

(21) Appl. No.: 18/447,622

(22) Filed: Aug. 10, 2023

(65) Prior Publication Data

US 2024/0067230 A1 Feb. 29, 2024

(30) Foreign Application Priority Data

Aug. 24, 2022 (JP) ................................. 2022-133385

(51) Int. Cl.
*B60W 60/00* (2020.01)
*B60W 50/14* (2020.01)

(52) U.S. Cl.
CPC ........ *B60W 60/0053* (2020.02); *B60W 50/14* (2013.01); *B60W 2520/10* (2013.01); *B60W 2552/10* (2020.02); *B60W 2552/53* (2020.02); *B60W 2710/20* (2013.01); *B60W 2720/106* (2013.01)

(58) Field of Classification Search
CPC ............. B60W 60/0053; B60W 50/14; B60W 2520/10; B60W 2552/10; B60W 2552/53; B60W 2710/20; B60W 2720/106; B60W 2050/146; B60W 30/0953; B60W 60/0015
See application file for complete search history.

(56) References Cited

U.S. PATENT DOCUMENTS

| | | | | |
|---|---|---|---|---|
| 2017/0028995 A1* | 2/2017 | Mori | ................. | B60W 60/0053 |
| 2017/0305420 A1* | 10/2017 | Desens | ................ | G05D 1/0238 |
| 2018/0237008 A1* | 8/2018 | Matsumura | ....... | B60W 30/0956 |

(Continued)

FOREIGN PATENT DOCUMENTS

| | | |
|---|---|---|
| JP | 2017056765 A | 3/2017 |
| JP | 2019133488 A | 8/2019 |
| WO | 2019043847 A1 | 3/2019 |

*Primary Examiner* — James J Lee
*Assistant Examiner* — Alexander George Matta
(74) *Attorney, Agent, or Firm* — Dickinson Wright, PLLC

(57) ABSTRACT

A travel controller autonomously controlling a travel of a vehicle, detecting a departure preventer preventing the vehicle from running off a road at an edge of the road under autonomous control from surrounding data representing surroundings of the vehicle, when no departure preventer is detected, determining a possibility of the vehicle reaching the edge of the road based on an expected movement amount of the vehicle in the lateral direction until stopping and a distance from the vehicle to the road edge, and, when there is a possibility of the vehicle reaching the road edge, notifying the driver of a transition demand demanding transition from the autonomous control to manual control of a travel of the vehicle based on driving operations of the driver of the vehicle, and when there is no possibility of the vehicle reaching the road edge, not notifying the driver of the transition demand.

12 Claims, 6 Drawing Sheets

(56)          References Cited

U.S. PATENT DOCUMENTS

2020/0148205  A1      5/2020  Yoshida et al.
2020/0406969  A1*   12/2020  Ersal ..................... B60W 10/20
2021/0061271  A1*    3/2021  Omikawa ........... G06V 20/588
2022/0118973  A1*    4/2022  Craigen ............... B60W 30/12
2022/0204027  A1*    6/2022  Hitakatsu .......... B60W 60/0055
2023/0242119  A1*    8/2023  Stein ................... B60W 30/146
                                                              701/26

* cited by examiner

6

ECU

| COMMUNICATIION INTERFACE | 61 |
| MEMORY | 62 |
| PROCESSOR | 63 |

63

PROCESSOR

| TRAVEL CONTROL UNIT | 631 |
| DETECTION UNIT | 632 |
| DETERMINATION UNIT | 633 |
| NOTIFICATION UNIT | 634 |
| STOPPING CONTROL UNIT | 635 |

TRAVEL CONTROLLER AND TRAVEL CONTROL METHOD FOR ALERTING DRIVER OF ROAD EDGE

FIELD

The present disclosure relates to a travel controller and a travel control method for controlling travel of a vehicle.

BACKGROUND

A known travel controller for autonomously controls acceleration, deceleration, or steering of a vehicle by using information outputted from a camera or other sensor mounted on the vehicle and representing surroundings of the vehicle. The travel controller autonomously controls the travel of the vehicle when the situation such as the terrain of the surroundings, objects present in the surroundings, and the state of the driver satisfies predetermined conditions.

Japanese Unexamined Patent Publication No. 2019-133488 (below, "PTL 1") describes a driver assistance device for providing assistance for switching from autonomous driving control to manual driving control. The driver assistance device described in PTL 1, when manual switching conditions for switching from autonomous driving control to manual driving control are not satisfied, notifies a driver of the reasons thereof. In PTL 1, the manual switching conditions include the traveling state of the vehicle satisfying predetermined vehicle travel conditions. In terms of the driver assistance device described in PTL 1, the vehicle travel conditions include that the vehicle is traveling slower than a predetermined vehicle speed, that the vehicle is traveling by a steering angle of less than a predetermined steering angle, and that obstacles are not present within a predetermined distance in the surroundings of the vehicle.

SUMMARY

A vehicle may run off from the road edge according to steering at a road section where no departure preventer such as a wall or guard rail at a road edge is arranged (open section). When a vehicle traveling under autonomous control by a travel controller arrives at an open section, the vehicle controller preferably demands the driver transition from autonomous control to manual control based on operations by the driver for a suitable prevention of the vehicle from running off the road. However, the transition demand in all open sections decreases the time period under autonomous control by the travel controller and the convenience provided by the travel controller to the driver would decline.

It is an object of the present disclosure to provide a travel controller that can suitably control the travel of the vehicle in an open section.

A travel controller according to the present disclosure comprises a processor configured to autonomously control at least one of acceleration, deceleration, and steering of a vehicle. The processor of the travel controller further detects a departure preventer preventing the vehicle from running off a road at an edge of the road on which the vehicle is traveling under autonomous control from surrounding data representing surroundings of the vehicle generated by a surrounding sensor mounted on the vehicle. The processor of the travel controller further determines, when no departure preventer is detected, a possibility of the vehicle reaching the road edge based on an expected movement amount of the vehicle in the lateral direction until stopping from the current speed of the vehicle and a distance from the vehicle to the road edge. The processor of the travel controller further notifies, when there is a possibility of the vehicle reaching the road edge, the driver of a transition demand demanding transition from the autonomous control to manual control of acceleration, deceleration, and steering of the vehicle based on driving operations of the driver of the vehicle, and, when there is no possibility of the vehicle reaching the road edge, does not notify the driver of a transition demand.

In the travel controller according to the present disclosure, the processor, in the determination, preferably calculates a maximum amount of movement of the vehicle in the lateral direction expected when steering by a steering operation amount not more than a steering operation threshold and decelerating by a predetermined acceleration rate until stopping from the current speed of the vehicle as the expected movement amount in the lateral direction.

In the travel controller according to the present disclosure, the processor, in the detection, preferably further detects lane lines demarcating one or more lanes included in the road from the surrounding data and, the processor is preferably further configured to, when there is a possibility of the vehicle reaching the road edge and no lane line is detected from the surrounding data, perform a stopping control of acceleration, deceleration, and steering of the vehicle so that the vehicle stops at a road shoulder included in the road.

In the travel controller according to the present disclosure, the processor, in performing the stopping control, preferably terminates the stopping control when a lane line is detected after starting the stopping control.

A travel control method according to the present disclosure comprises autonomously controlling at least one of acceleration, deceleration, and steering of a vehicle, detecting a departure preventer preventing the vehicle from running off a road at an edge of the road on which the vehicle is traveling under autonomous control from surrounding data representing surroundings of the vehicle generated by a surrounding sensor mounted on the vehicle, when no departure preventer is detected, determining a possibility of the vehicle reaching the road edge based on an expected movement amount of the vehicle in the lateral direction until stopping from the current speed of the vehicle and a distance from the vehicle to the road edge, when there is a possibility of the vehicle reaching the road edge, notifying the driver of a transition demand demanding transition from the autonomous control to manual control of acceleration, deceleration, and steering of the vehicle based on driving operations of the driver of the vehicle, and, when there is no possibility of the vehicle reaching the road edge, not notifying the driver of the transition demand.

A computer program for travel control stored in a non-transitory computer readable medium according to the present disclosure causes a computer mounted on a vehicle to execute a process including autonomously controlling at least one of acceleration, deceleration, and steering of the vehicle, detecting a departure preventer preventing the vehicle from running off a road at an edge of the road on which the vehicle is traveling under autonomous control from surrounding data representing surroundings of the vehicle generated by a surrounding sensor mounted on the vehicle, when no departure preventer is detected, determining a possibility of the vehicle reaching the road edge based on an expected movement amount of the vehicle in the lateral direction until stopping from the current speed of the vehicle and a distance from the vehicle to the road edge, when there is a possibility of the vehicle reaching the road edge, notifying the driver of a transition demand demanding transition from the autonomous control to manual control of acceleration, deceleration, and steering of the vehicle based on driving operations of the driver of the vehicle, and, when there is no possibility of the vehicle reaching the road edge, not notifying the driver of the transition demand.

According to the travel controller of the present disclosure, it is possible to suitably control the travel of the vehicle in an open section.

DESCRIPTION OF EMBODIMENTS

A travel controller that suitably controls travel of a vehicle in an open section will be now described in detail with reference to the attached drawings. The travel controller autonomously controls at least one of acceleration, deceleration, and steering of the vehicle. The travel controller detects a departure preventer preventing a vehicle from running off a road at an edge of the road on which the vehicle is traveling under autonomous control from a surrounding image representing surroundings of the vehicle generated by a surrounding sensor mounted on the vehicle. When no departure preventer is detected, the travel controller determines a possibility of the vehicle reaching the road edge based on an expected movement amount of the vehicle in the lateral direction until stopping from the current speed of the vehicle and a distance from the vehicle to the road edge. When there is a possibility of the vehicle reaching the road edge, the travel controller notifies the driver of a transition demand demanding transition from the autonomous control to manual control of acceleration, deceleration, and steering of the vehicle based on driving operations of the driver of the vehicle. When there is no possibility of the vehicle reaching the road edge, the travel controller does not notify the driver of the transition demand.

Figure 1:
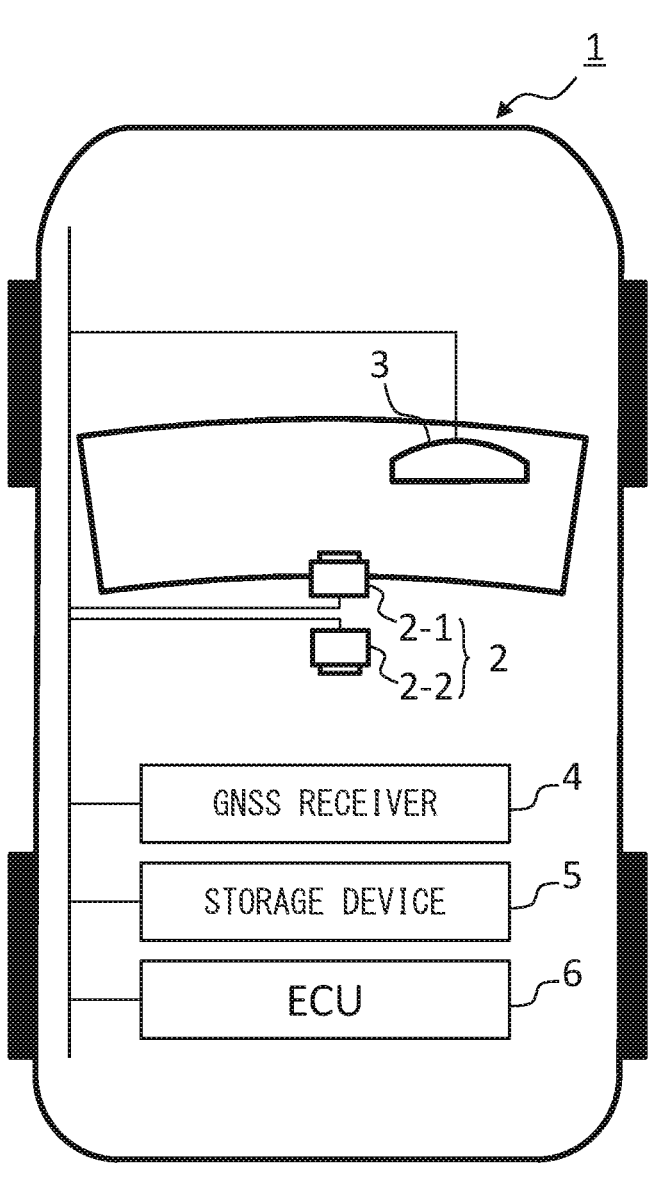
FIG. 1 schematically illustrates the configuration of a vehicle equipped with a travel controller.

FIG. 1 schematically illustrates the configuration of a vehicle equipped with a travel controller.

The vehicle 1 includes surrounding cameras 2, a meter display 3, a global navigation satellite system (GNSS) receiver 4, a storage device 5, and an electronic control unit (ECU) 6. The ECU 6 is an example of the travel controller. The surrounding cameras 2, the meter display 3, the GNSS receiver 4, and the storage device 5 and the ECU 6 are connected via an in-vehicle network conforming to a standard, such as a controller area network, so that they can communicate with each other.

The surrounding camera 2 is an example of surrounding sensor for generating surrounding images representing surroundings of the vehicle 1. The surrounding camera 2 includes a two-dimensional detector constructed from an array of optoelectronic transducers, such as CCD or C-MOS, having sensitivity to visible light and a focusing optical system that forms an image of a target region on the two-dimensional detector. The surrounding camera 2 includes a front surrounding camera 2-1 and back surrounding camera 2-2. The front surrounding camera 2-1 is disposed, for example, in a front and upper area in the interior of the vehicle and oriented forward, while the back surrounding camera 2-2 is disposed in a back and upper area in the interior of the vehicle and oriented backward. The surrounding camera 2 takes pictures of the surroundings of the vehicle 1 through a windshield or rear glass every predetermined capturing period (e.g., $\frac{1}{30}$ to $\frac{1}{10}$ seconds) and outputs surrounding images representing the surroundings as surrounding data.

The meter display 3, which is an example of an output device, includes, for example, a liquid crystal display. The meter display 3 displays a message showing a transition demand demanding transition of operation from autonomous control to manual control so as to be visible to the driver. The vehicle 1 may also include, as an output device, a speaker device (not shown) able to output to the driver an audio message or a seat vibrator (not shown) able to output to the driver a tactile message by making the seat vibrate.

The GNSS receiver 4 receives GNSS signals from GNSS satellites at predetermined intervals and determines the position of the vehicle 1 based on the received GNSS signals. The GNSS receiver 4 outputs a positioning signal indicating the result of determination of the position of the vehicle 1 based on the GNSS signals to the ECU 6 via the in-vehicle network at predetermined intervals.

The storage device 5, which is an example of a storage unit, includes, for example, a hard disk drive or a nonvolatile semiconductor memory. The storage device 5 contains map data including information on features, such as lane lines, in association with their positions.

The ECU 6 autonomously controls the travel of the vehicle based on the positions and speeds of other vehicles traveling in the surroundings of the vehicle 1 represented in the surrounding images generated by the surrounding camera 2. The ECU 6 detects a departure preventer from the surrounding image and, when a departure preventer is not detected, notifies the driver of a transition demand in response to the possibility of the vehicle 1 reaching a road edge.

Figures 2, 3:
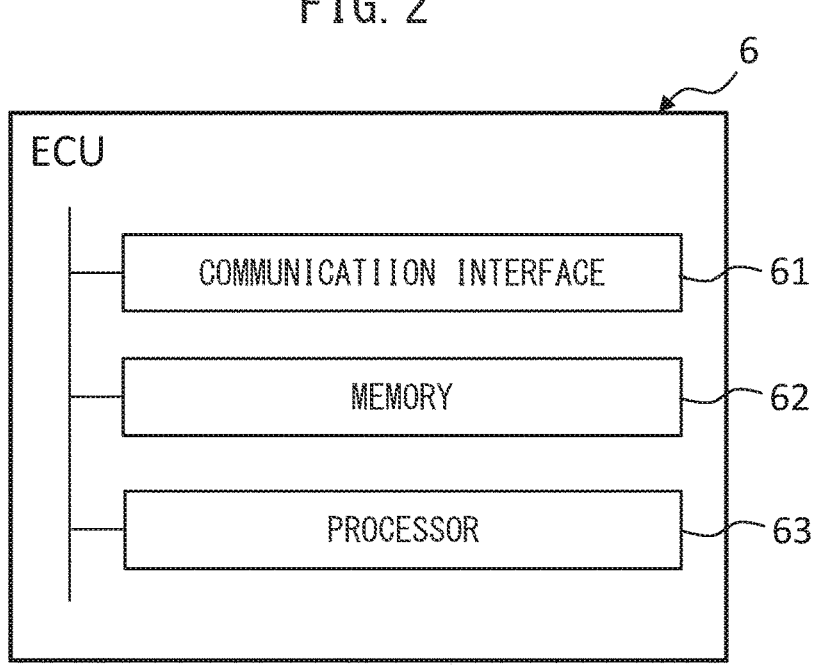
FIG. 2 schematically illustrates hardware of an ECU.
FIG. 3 is a functional block diagram of a processor included in the ECU.

FIG. 2 schematically illustrates the hardware of the ECU 6. The ECU 6 includes a communication interface 61, a memory 62, and a processor 63.

The communication interface 61, which is an example of a communication unit, includes a communication interface circuit for connecting the ECU 6 to the in-vehicle network. The communication interface 61 provides received data to the processor 63. Further, the communication interface 61 outputs data provided from the processor 63 to an external device.

The memory 62, which is another example of a storage unit, includes volatile and nonvolatile semiconductor memories. The memory 62 contains various types of data used for processing by the processor 63, e.g., groups of parameters of a neural network used as a classifier for detecting departure preventers, lane lines, and other vehicles from a surrounding image, and transition demand notified to the driver for demanding transition of operation, etc. The memory 62 also stores various application programs, such as a travel control program to execute therefor.

The processor 63, which is an example of a control unit, includes one or more processors and a peripheral circuit thereof. The processor 63 may further include another operating circuit, such as a logic-arithmetic unit, an arithmetic unit, or a graphics processing unit.

FIG. 3 is a functional block diagram of the processor 63 included in the ECU 6.

As its functional blocks, the processor 63 of the ECU 6 includes a travel control unit 631, a detection unit 632, a determination unit 633, a notification unit 634, and a stopping control unit 635. These units included in the processor 63 are functional modules implemented by a computer program stored in the memory 62 and executed on the processor 63. The computer program for achieving the functions of the units of the processor 63 may be provided in a form recorded on a computer-readable and portable medium, such as a semiconductor memory, a magnetic recording medium, or an optical recording medium. Alternatively, the units included in the processor 63 may be implemented in the ECU 6 as separate integrated circuits, microprocessors, or firmware.

The travel control unit 631 autonomously controls at least one of the acceleration, deceleration, and steering of the vehicle using the map information.

The travel control unit 631 acquires from the storage device 5 the map information representing the lanes and other terrain around the current position of the vehicle 1 identified by the positioning signal received from the GNSS receiver 4. The travel control unit 631 inputs the surrounding images generated by the surrounding camera 2 mounted on the vehicle 1 into a classifier that has been trained in advance to detect surrounding vehicles and other moving objects to thereby detect the moving objects positioned in the surroundings of the vehicle 1. The classifier may be, for example, a convolutional neural network (CNN) including a plurality of convolution layers connected in series from the input toward the output. A CNN that has been trained in accordance with a predetermined training technique such as backpropagation, using a plurality of images including vehicles and other moving objects as training data operates as a classifier to detect moving objects from surrounding images.

The travel control unit 631 generates a travel route along a lane represented in the terrain of the surroundings of the vehicle 1 so that the distance to moving objects in the surroundings of the vehicle 1 not to fall below a certain level. The travel control unit 631 also outputs control signals to a traveling mechanism (not shown) of the vehicle 1 so that the vehicle 1 travels along the travel route. The traveling mechanism includes, for example, an engine or motor for accelerating the vehicle 1, brakes for decelerating the vehicle 1, and a steering mechanism for steering the vehicle 1.

Figure 4:
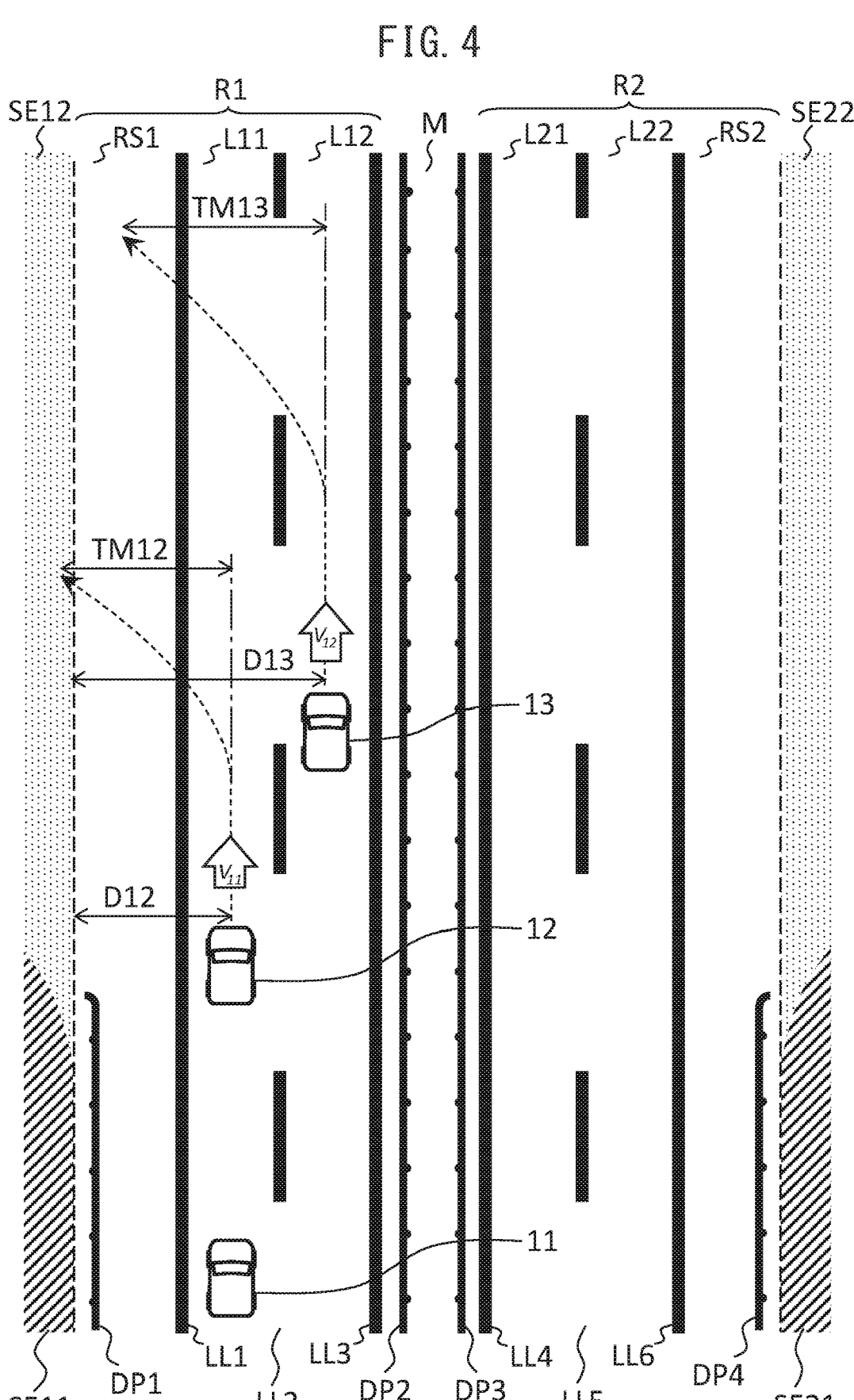
FIG. 4 is a diagram for explaining an example of travel control.

FIG. 4 is a diagram for explaining an example of travel control.

FIG. 4 shows a situation where vehicles 11, 12, and 13 respectively having configurations similar to the vehicle 1 are traveling on a road R1 under autonomous control. The vehicles 11, 12, and 13 may be respectively different vehicles or may be the same vehicle at different points of time.

The road R1 and a road R2 are roads arranged alongside each other between surrounding environments SE11, SE12 and surrounding environments SE21, SE22 across a median strip M and having different directions of advance. FIG. 4 shows the situation at a region under left side driving rule, but a situation at a region under right side driving rule can be found by flipping FIG. 4 horizontally.

The road R1 has a road shoulder RS1, a lane L11, and a lane L12. The road shoulder RS1 and the lane L11 are demarcated by a lane line LL1. The lane L11 and the lane L12 are demarcated by a lane line LL2. The road R1 and median strip M are demarcated by a lane line LL3.

The surrounding environment SE11 is an environment in the surroundings of the road R1 with a relatively large possibility of a serious accident when a vehicle enters it due to, for example, it being a sharp slope or there being buildings. At the edge of the road shoulder RS1 facing the surrounding environment SE11, a departure preventer DP1 (guard rail) preventing the vehicle from entering the surrounding environment SE11 is arranged.

The surrounding environment SE12 is an environment in the surroundings of the road R1 with a relatively small possibility of a serious accident when a vehicle enters it due to, for example, it being flat ground and there being no buildings. At the edge of the road shoulder RS1 facing the surrounding environment SE12, no departure preventer is arranged.

The median strip M is a region of a predetermined width disposed for separating the road R1 and the road R2. When a vehicle traveling on the road R1 were to enter the median strip M facing the road R2 where the direction of advance is opposite to the road R1, the possibility of a serious accident occurring would be relatively large. For this reason, a departure preventer DP2 (guard rail) is arranged at the edge of the median strip M facing the road R1.

The road R2 is similar to the road R1 except for the direction of advance, so explanations of the lanes L21, L22, the road shoulder RS2, the lane lines LL4, LL5, LL6, the surrounding environments SE21, SE22, and the departure preventers DP3, DP4 at the road R2 will be omitted.

The detection unit 632 detects a departure preventer at the road edge on which the vehicle 1 is traveling under autonomous control from surrounding images representing the state of the surroundings of the vehicle 1 generated by the surrounding camera 2 mounted on the vehicle 1.

The travel control processing by the functional blocks of the processors 63 of respective ECUs 6 which are mounted on the vehicles 11, 12, 13 shown in FIG. 4 will be hereinafter described. The processor 63 of the ECU 6 detects a departure preventer arranged at the road edge from the surrounding images generated by the surrounding camera 2. If a departure preventer is not detected, the processor 63 of the ECU 6 determines whether there is a possibility of the vehicle 1 reaching the road edge. Further, if there is a possibility of the vehicle 1 reaching the road edge, the processor 63 of the ECU 6 notifies a transition demand to the driver of the vehicle 1.

The detection unit 632 detects a departure preventor arranged at the road edge by inputting the surrounding images generated by the surrounding camera 2 mounted in the vehicle 1 into a classifier that has been trained in advance to detect the edges of roads and departure preventers from the images. The classifier may be, for example, a CNN trained to detect a departure preventer from an input image. The detection of moving objects by the travel control unit 631 and the detection of departure preventers by the detection unit 632 may be parallelly executed by using a CNN trained to detect moving objects and departure preventers from an inputted image as a classifier.

The classifier used by the detection unit 632 to detect the road edge and the departure preventer from the surrounding images may further detect lane lines demarcating one or more lanes included in the road from the surrounding images.

The determination unit 633 determines whether a departure preventer has been detected from the surrounding images. The ECU 6 performs stopping control (explained later) for stopping the vehicle 1 at a road shoulder when, for example, a serious malfunction has occurred in the autonomous control by the travel control unit 631 or the driver does not respond to an transition demand from autonomous control to manual control based on operations of the driver. Therefore, when a departure preventer is not detected from the surrounding images, the determination unit 633 determines whether stopping control can be suitably performed. That is, determination unit 633 estimates the movement amount of the vehicle in the lateral direction until stopping from the current speed of the vehicle at performing stop control. The determination unit 633 also determines a possibility of the vehicle reaching the road edge based on the estimated movement amount of the vehicle in the lateral direction and the distance from the vehicle to the road edge.

The determination unit 633 retrieves from the memory 62 the movement amount in the lateral direction associated with the segment of vehicle speed in which the current speed of the vehicle is included among the movement amounts in the lateral direction stored in the memory 62 respectively associated with the segments. The memory 62 stores larger movement amounts in the lateral direction the faster the vehicle speed segment associated with.

The determination unit 633 identifies the position in the road of the lane on which the vehicle 1 is currently traveling from the surrounding images. The determination unit 633 identifies the number of lanes included in the road of the surroundings of the current position from the map information of the surroundings of the current position acquired from the storage device 5. The determination unit 633 detects the number of the lane lines at the left side from the vehicle 1 in the surrounding images. A lane line at the left side from the vehicle 1 is the lane line approaching the vanishing point from the bottom left of the vanishing point. The vanishing point can be found as an intersection of the lines formed using the edges detected from the surrounding images. The determination unit 633 can identify the number of the lane from the left (number of lane line at the left side) on which the vehicle 1 is traveling among a specific number of lanes. The determination unit 633 estimates the distance from the vehicle to the road edge by adding ½ of the width of the current lane indicated in the map information of the surroundings of the current position acquired from the storage device 5, the width of the lane between the current lane and the road shoulder, and the width of the road shoulder.

The determination unit 633 determines that there is a possibility of the vehicle reaching the road edge when the movement amount in the lateral direction is larger than the distance from the vehicle to the road edge.

The determination unit 633 may also calculate as the expected movement amount in the lateral direction the maximum amount of movement of the vehicle in the lateral direction expected when steering by a steering operation amount not more than a steering operation threshold stored in the memory 62 and decelerating by a predetermined acceleration rate (for example 0.35 G) stored in the memory 62. The steering operation threshold indicates the maximum steering operation angle for operating a steering device of a vehicle (steering wheel). By setting the steering operation threshold to, for example, ±90 degrees, the trouble of the arm of the driver becoming tangled up due to operation of the steering device can be prevented even when the driver had been gripping the steering device. the steering operation threshold may be stored in the memory 62 associated with the segment of the vehicle speed. The memory 62 may also store a smaller steering operation threshold the faster the vehicle speed segment associated with.

Figure 5:
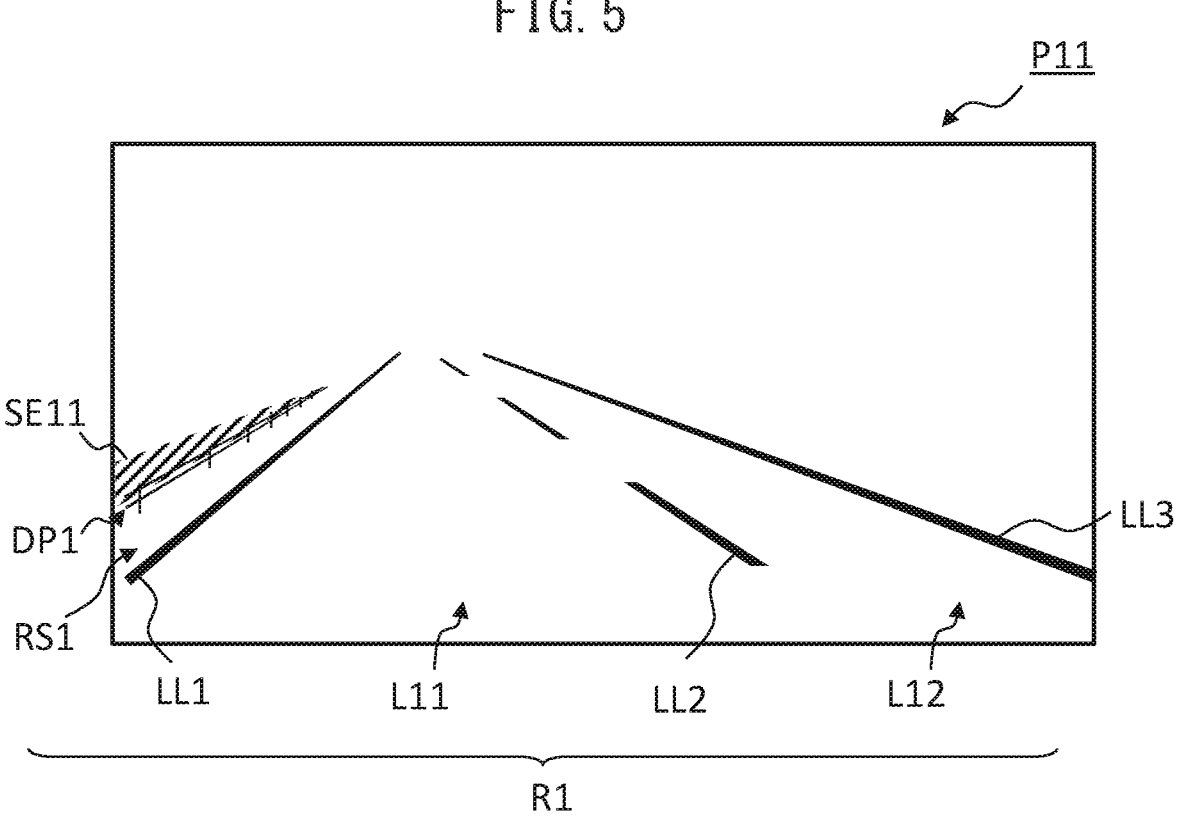
FIG. 5 schematically illustrates a first example of a surrounding image.

FIG. 5 schematically illustrates a first example of a surrounding image. The surrounding image P11 shown in FIG. 5 is generated by the front surrounding camera 2-1 mounted on the vehicle 11 traveling on the lane L11 of the road R1. The vehicle 11 is traveling at a position on the lane L11 where no departure preventer DP1 is arranged at the edge of the road shoulder RS1.

The surrounding image P11 shows the road R1 having the lanes L11, L12 and the road shoulder RS1 demarcated by the lane lines LL1, LL2 and LL3, and the surrounding environment SE11. Note that, at the surrounding image P11, the median strip M and road R2 including the departure preventer DP2 are omitted for simplification of the explanation. The same is true in the later explained second example and third example of the surrounding image.

The detection unit 632 detects the departure preventer DP1 at the edge of the road shoulder RS1 from the surrounding image. In this case, the determination unit 633 does not determine a possibility of the vehicle reaching the road edge.

Figure 6:
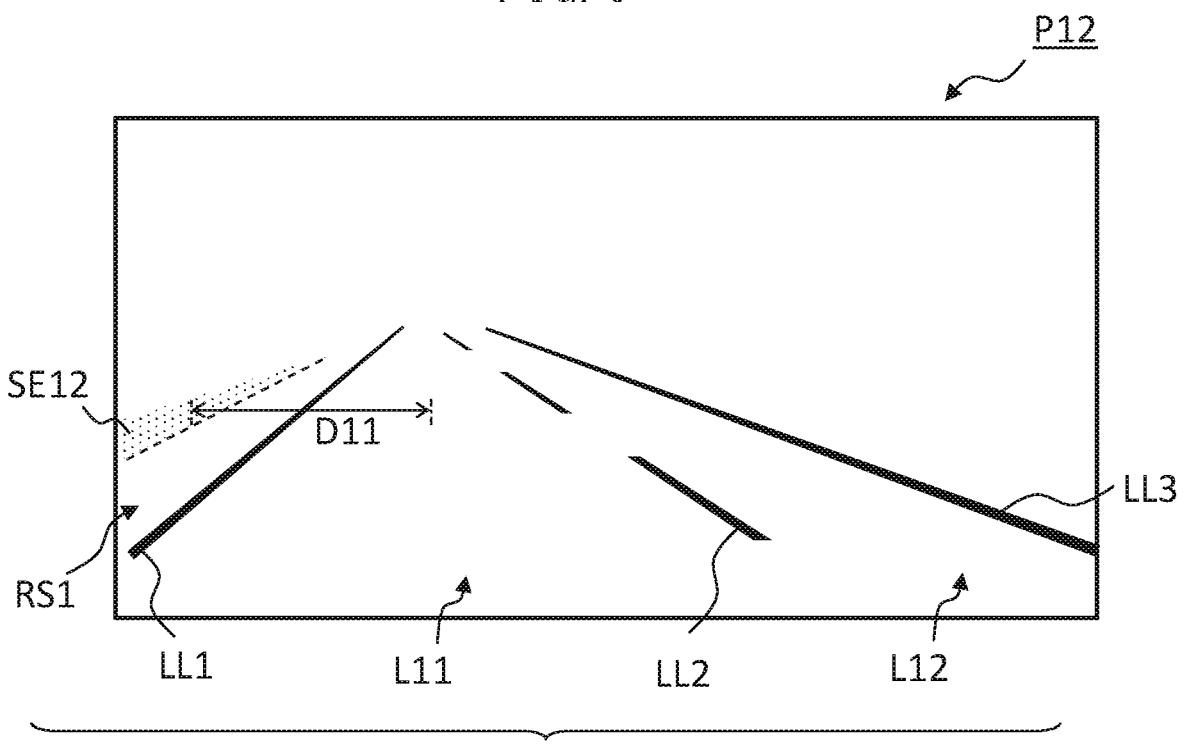
FIG. 6 schematically illustrates a second example of a surrounding image.

FIG. 6 schematically illustrates a second example of a surrounding image. The surrounding image P12 shown in FIG. 6 is generated by the front surrounding camera 2-1 mounted at the vehicle 12 traveling on the lane L11 of the road R1. The vehicle 12 is traveling at a position on the road R1 where no departure preventer DP1 is arranged at the edge of the road shoulder RS1 (open section).

The surrounding image P12 shows the road R1 having the lanes L11, L12 and the road shoulder RS1 demarcated by the lane lines LL1, LL2 and LL3, and the surrounding environment SE12.

The detection unit 632 does not detect a departure preventer at an edge of the road shoulder RS1 from the surrounding image. In this case, the determination unit 633 determines a possibility of vehicle reaching the road edge.

In the second example of the surrounding image, the estimated movement amount TM12 of the vehicle 12 in the lateral direction until stopping from the current speed V11 of the vehicle 12 is larger than the distance D12 from the vehicle 12 to the edge of the road R1. Therefore, the determination unit 633 determines that there is a possibility of the vehicle 12 reaching the edge of the road R1.

Figure 7:
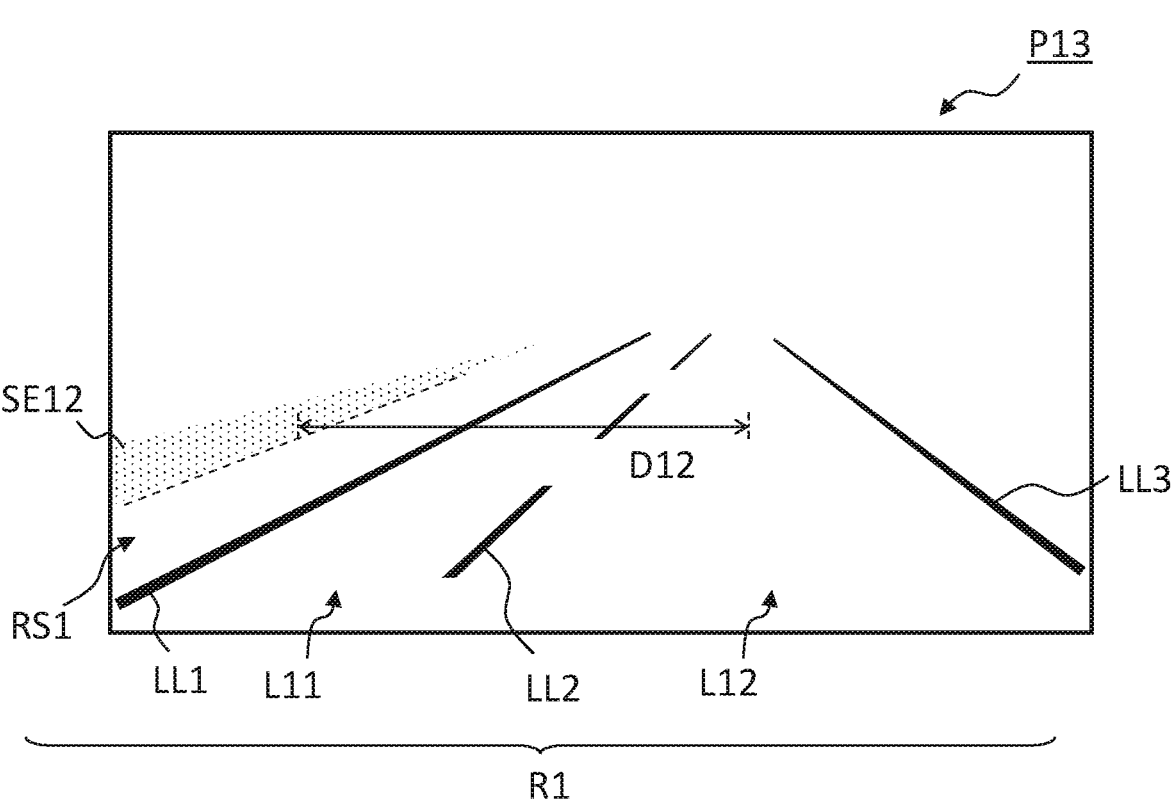
FIG. 7 schematically illustrates a third example of a surrounding image.
Figure 8:
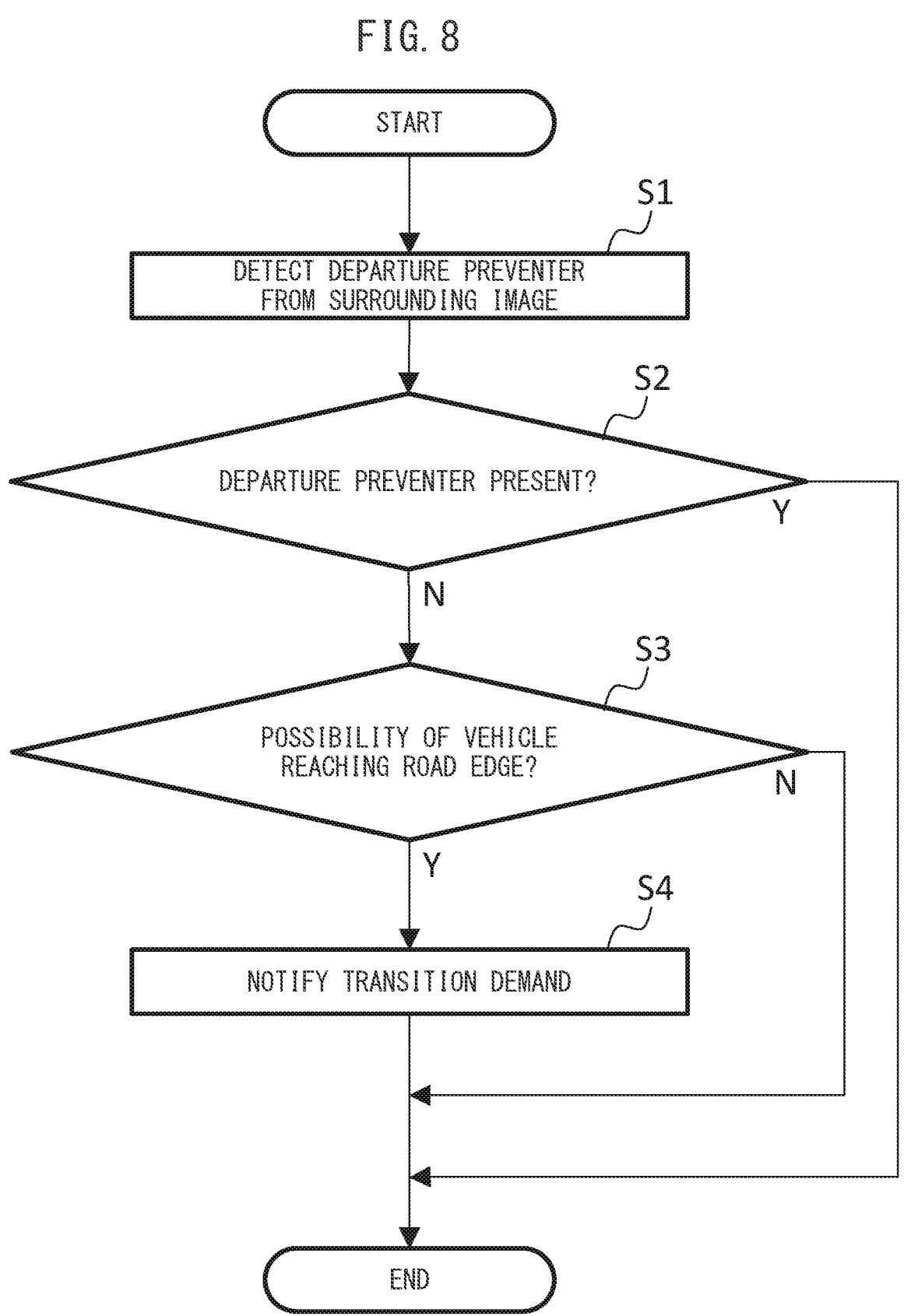
FIG. 8 is a flowchart of a process for travel control.

FIG. 7 schematically illustrates a third example of a surrounding image. The surrounding image P13 shown in FIG. 7 is generated by the front surrounding camera 2-1 mounted in the vehicle 13 traveling on the lane L12 of the road R1. The vehicle 13 is traveling on the road R1 at a position (open section) where no departure preventer DP1 is arranged at an edge of the road shoulder RS1.

The surrounding image P13 shows the road R1 having the lanes L11, L12 and the road shoulder RS1 demarcated by the lane lines LL1, LL2 and LL3, and the surrounding environment SE12.

The detection unit 632 does not detect a departure preventer at an edge of the road shoulder RS1. In this case, the determination unit 633 determines a possibility of vehicle reaching a road edge.

In the third example of the surrounding image, the estimated movement amount TM13 of the vehicle 13 in the lateral direction until stopping from the current speed V12 of the vehicle 13 is smaller than the distance D13 from the vehicle 13 to the edge of the road R1. Therefore, the determination unit 633 determines that there is no possibility of the vehicle 13 reaching the edge of the road R1.

When it is determined that there is a possibility of the vehicle 1 reaching the road edge, since the stopping control cannot be suitably performed, the notification unit 634 notifies the driver of a transition demand demanding transition from autonomous control to manual control of acceleration, deceleration, and steering of the vehicle 1 based on driving operations of the driver of the vehicle 1. When it is determined that there is no possibility of the vehicle 1 reaching a road edge, since the stopping control can be suitably performed, the notification unit 634 does not notify the driver of the transition demand. That is, in the situation of the vehicle 12 in FIG. 4, the driver is notified of the transition demand, while in the situation of the vehicle 13, the driver is not notified of the transition demand.

The notification unit 634 notify the transition demand to the driver of the vehicle 1 by, for example, displaying a transition demand image stored in the memory 62 on the meter display 3. The transition demand image includes the text "Autonomous driving control will end. Please operate manually." The transition demand image may also be an image demanding the driver to take action requested from the driver of the vehicle 1 for transition (for example, gripping the steering wheel). Further, the notification unit 634 may notify the transition demand to the driver by playing back a transition demand voice stored in the memory 62 by a speaker device. Further, the notification unit 634 may notify the transition demand to the driver by vibrating a seat vibrator in a transition demand vibrating pattern stored in the memory 62.

The stopping control unit 635 performs, when there is a possibility of the vehicle 1 reaching the road edge and a lane line is not detected from the surrounding image, stopping control for acceleration, deceleration, and steering of the vehicle so that the vehicle stops at a road shoulder included at the road.

The stopping control unit 635 acquires a possibility of the vehicle 1 reaching the road edge from the determination unit 633. The stopping control unit 635 also acquires whether a lane line is detected from the surrounding image from the detection unit 632. If there is a possibility of the vehicle 1 reaching the road edge and a lane line is not detected from the surrounding image, the stopping control unit 635 performs the stopping control by outputting a control signal to the travel mechanism of the vehicle so as to stop at a road shoulder and minimizes the risk of an accident occurring.

The stopping control unit 635 may also end the stopping control when a lane line is detected from the surrounding image again after starting the stopping control. In this case, travel of the vehicle 1 is autonomously controlled by the travel control unit 631.

The stopping control unit 635 may also start or end the stopping control according to whether a lane line demarcating the lane in which the vehicle 1 is traveling is detected among the lane lines.

FIG. 6 is a flowchart of the travel control processing. The ECU 6 repeatedly performs the travel control processing at predetermined time intervals (for example, 1/10 second intervals) while the travel control unit 631 is autonomously controlling travel of the vehicle 1.

First, the detection unit 632 of the processor 63 of the ECU 6 detects a departure preventer arranged at the road edge on which the vehicle 1 is traveling from a surrounding image (step S1).

Next, the determination unit 633 determines whether a departure preventer is detected at the road edge on which the vehicle 1 is traveling (step S2).

When a departure preventer is detected (step S2: Y), the ECU 6 terminates the travel control processing. In this case, autonomous control of travel of the vehicle 1 by the travel control unit 631 of the ECU 6 is continued.

When a departure preventer is not detected (step S2: N), the determination unit 633 determines a possibility of the vehicle 1 reaching the road edge (step S3).

When it is determined that there is no possibility of the vehicle 1 reaching the road edge (step S3: N), the ECU 6 terminates the travel control processing. In this case, autonomous control of travel of the vehicle 1 by the travel control unit 631 of the ECU 6 is continued.

When it is determined that there is a possibility of the vehicle 1 reaching the road edge (step S3: Y), the notification unit 634 notifies the driver of the vehicle 1 of the transition demand (step S4) and terminates the travel control processing. In this case, autonomous control of travel of the vehicle 1 by the travel control unit 631 of the ECU 6 is continued, but when the driver responds to the transition demand, the ECU 6 terminates the autonomous control and starts manual control. When the driver does not respond to the transition demand within a predetermined time period, the stopping control unit 635 of the ECU 6 performs the stopping control.

The ECU 6 can avoid a decrease in the travel time period under autonomous control due to transition of operation in every open section and suitably control travel of the vehicle 1.

The vehicle 1 may also have as a surrounding sensor a LiDAR (light detection and ranging) sensor or radar (radio detection and ranging) sensor. A LiDAR sensor or radar sensor outputs as surrounding data a range image whose pixels each has a value depending on the distances to an object represented in the pixels, based on the surrounding state of the vehicle 1.

Note that those skilled in the art can apply various changes, substitutions, and modifications without departing from the spirit and scope of the present disclosure.

What is claimed is:

1. A travel control method comprising:

autonomously controlling acceleration, deceleration, and steering of a vehicle; and while the vehicle is traveling under autonomous control, performing a travel control processing comprising:

performing detection of whether a departure preventer, configured to prevent the vehicle from running off a road, is present on a road on which the vehicle is traveling based on data from a sensor mounted on the vehicle;

when no departure preventer is detected, determining a possibility of the vehicle reaching the road edge based on a comparison between an expected movement amount of the vehicle in a lateral direction until stopping from a current speed of the vehicle, and a lateral distance from the vehicle to the road edge, when there is a possibility of the vehicle reaching the road edge, notifying a driver of a transition demand demanding transition from the autonomous control to manual control of the vehicle, and, when there is no possibility of the vehicle reaching the road edge, not notifying the driver of the transition demand; and when a departure preventer is detected, terminating the travel control processing without determining the possibility of the vehicle reaching the road edge and without notifying the driver of the transition demand.

2. The travel control method according to claim 1, further comprising:

calculating the expected movement amount of the vehicle in the lateral direction until stopping based on a maximum amount of movement of the vehicle in the lateral direction expected when steering by a steering operation amount not more than a steering operation threshold and decelerating by a predetermined acceleration rate until stopping from the current speed of the vehicle.

3. The travel control method according to claim 1, further comprising:

performing detection of whether there is a lane line, demarcating a lane included in the road, based on the data from the sensor, and when there is a possibility of the vehicle reaching the road edge and no lane line is detected, perform the autonomous stopping control of the vehicle so that the vehicle stops at a road shoulder included in the road.

4. The travel control method according to claim 3, wherein performing the autonomous stopping control comprises terminating the autonomous stopping control when a lane line is detected after starting the autonomous stopping control.

5. A non-transitory computer-readable medium having a computer program for travel control stored therein, the computer program causing a computer mounted on a vehicle to execute a process comprising:

autonomously controlling acceleration, deceleration, and steering of the vehicle; and while the vehicle is traveling under autonomous control performing a travel control processing comprising:

performing detection of whether a departure preventer, configured to prevent the vehicle from running off a road, is present on a road on which the vehicle is traveling based on data from a sensor mounted on the vehicle;

when no departure preventer is detected, determining a possibility of the vehicle reaching the road edge based on a comparison between an expected movement amount of the vehicle in a lateral direction until stopping from a current speed of the vehicle, and a lateral distance from the vehicle to the road edge, when there is a possibility of the vehicle reaching the road edge, notifying a driver of a transition demand demanding transition from the autonomous control to manual control of the vehicle, and, when there is no possibility of the vehicle reaching the road edge, not notifying the driver of the transition demand; and when a departure preventer is detected, terminating the travel control processing without determining the possibility of the vehicle reaching the road edge and without notifying the driver of the transition demand.

6. The non-transitory computer-readable medium according to claim 5, wherein the process further comprises:

calculating the expected movement amount of the vehicle in the lateral direction until stopping based on a maximum amount of movement of the vehicle in the lateral direction expected when steering by a steering operation amount not more than a steering operation threshold and decelerating by a predetermined acceleration rate until stopping from the current speed of the vehicle.

7. The non-transitory computer-readable medium according to claim 5, wherein the process further comprises:

performing detection of whether there is a lane line, demarcating a lane included in the road, based on the data from the sensor, and when there is a possibility of the vehicle reaching the road edge and no lane line is detected, perform the autonomous stopping control of the vehicle so that the vehicle stops at a road shoulder included in the road.

8. The non-transitory computer-readable medium according to claim 7, wherein performing the autonomous stopping control comprises terminating the autonomous stopping control when a lane line is detected after starting the autonomous stopping control.

9. A travel controller comprising a processor configured to:

autonomously control acceleration, deceleration, and steering of a vehicle; and while the vehicle is traveling under autonomous control, perform a travel control processing comprising:

detecting whether a departure preventer, configured to prevent the vehicle from running off a road, is present on a road on which the vehicle is traveling based on data from a sensor mounted on the vehicle;

when no departure preventer is detected, determining a possibility of the vehicle reaching the road edge based on a comparison between an expected movement amount of the vehicle in a lateral direction until stopping from a current speed of the vehicle, and a lateral distance from the vehicle to the road edge, when there is a possibility of the vehicle reaching the road edge, notifying a driver of a transition demand demanding transition from the autonomous control to a manual control of the vehicle, and when there is no possibility of the vehicle reaching the road edge, not notifying the driver of the transition demand; and when a departure preventer is detected, terminating the travel control processing without determining the possibility of the vehicle reaching the road edge and without notifying the driver of the transition demand.

10. The travel controller according to claim 9, wherein the processor is further configured to:

calculate the expected movement amount of the vehicle in the lateral direction until stopping based on a maximum amount of movement of the vehicle in the lateral direction expected when steering by a steering operation amount not more than a steering operation threshold and decelerating by a predetermined acceleration rate until stopping from the current speed of the vehicle.

11. The travel controller according to claim 9, wherein the processor is further configured to:

perform detection of whether there is a lane line, demarcating a lane included in the road, based on the data from the sensor, and when there is a possibility of the vehicle reaching the road edge and no lane line is detected, perform the autonomous stopping control of the vehicle so that the vehicle stops at a road shoulder included in the road.

12. The travel controller according to claim 11, wherein performing the autonomous stopping control comprises terminating the autonomous stopping control when a lane line is detected after starting the autonomous stopping control.

* * * * *